United States Patent [19]
Stanfill et al.

[11] Patent Number: 5,819,021
[45] Date of Patent: *Oct. 6, 1998

[54] OVERPARTITIONING SYSTEM AND METHOD FOR INCREASING CHECKPOINTS IN COMPONENT-BASED PARALLEL APPLICATIONS

[75] Inventors: Craig Stanfill, Waltham; Cliff Lasser, Cambridge; Robert Lordi, Wayland, all of Mass.

[73] Assignee: Ab Initio Software Corporation, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 570,585

[22] Filed: Dec. 11, 1995

[51] Int. Cl.$^6$ .................................................... G06F 11/00
[52] U.S. Cl. ................ 395/182.13; 395/670; 395/182.11
[58] Field of Search ...................................... 395/674, 181, 395/670, 672, 182.11, 182.13

[56] References Cited

U.S. PATENT DOCUMENTS

| | | | |
|---|---|---|---|
| 4,005,391 | 1/1977 | MacPherson | 395/864 |
| 5,363,503 | 11/1994 | Gleeson | 395/182.08 |

OTHER PUBLICATIONS

"Software Schemes of Reconfiguration and Recovery in Distributed Memory Multicomputers Using the Actor Model", Peercy et al, Jun., 1995.

"Ickp: A consistent Checkpointer for Multicomputers", James S. Plank IEEE Parallel & Distributed Technology, 1994.

"Recovery in Distributed Systems Using Optimistic Message Logging and Checkpointing", David B. Johnson, May 1988.

"The Kelne Square Query Decomposer", David Reiner, 1993.

*Primary Examiner*—Majid A. Banankhan
*Attorney, Agent, or Firm*—Fish & Richardson P.C.

[57] ABSTRACT

Two methods for partitioning the work to be done by a computer program into smaller pieces so that checkpoints may be done more frequently. Initially, a parallel task starts with one or more input data sets having q initial partitions, divides the input data sets into p partitions by some combination of partitioning elements (i.e., partitioners/gatherers), runs an instance of a component program on each of the p partitions of the data, and produces one or more sets of output files, with each set being considered a partitioned data set. The invention is applied to such a task to create a new, "overpartitioned" task as follows: (1) the partitioner is replaced with an "overpartitioner" which divides its q inputs into n*p partitions, for some integer factor n; (2) the component program is run in a series of n execution phases, with p instances of the component program being run at any time. In each phase, each instance of the component program will read one overpartition of the input data and produce one partition of output data; (3) at the end of each of the n execution phases, the system is quiescent and may be checkpointed. A first embodiment explicitly overpartitions input data by using known partitioner programs, communication channels, and gatherer programs to produce overpartitioned intermediate files. The second embodiment dynamically overpartitions input data by arranging for the component programs to consecutively read contiguous subsets of the original input data.

12 Claims, 10 Drawing Sheets

OVERPARTITIONING SYSTEM AND METHOD FOR INCREASING CHECKPOINTS IN COMPONENT-BASED PARALLEL APPLICATIONS

BACKGROUND OF THE INVENTION

1. Field of the Invention

This invention relates to computer processing systems, and more particularly to a method for partitioning the work to be done by a computer program into smaller pieces so that checkpoints may be done more frequently.

2. Description of Related Art

Computational speeds of single processor computers have advanced tremendously over the past three decades. However, many fields require computational capacity that exceeds even the fastest single processor computer. An example is in transactional processing, where multiple users access computer resources concurrently, and where response times must be low for the system to be commercially acceptable. Another example is in database mining, where hundreds of gigabytes of information must be processed, and where processing data on a serial computer might take days or weeks. Accordingly, a variety of "parallel processing" systems have been developed to handle such problems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof Most business applications contain a set of "component programs" which transform the data in some fashion. For example, a payroll application might contain a program which transformed time sheets into paychecks. To use such a component as part of an application for execution on a parallel processing system, the following is common practice:

(1) A degree of parallelism p is chosen. In most cases, p is identical to the number of processors.

(2) One or more of the input(s) to the component program are divided among a set of p input files ("partitions").

(3) p instances of the component program are simultaneously run on different processors.

(4) Each instance of the component program processes one partition of the input data.

When the component program has finished running, each of its outputs will have been divided into p partitions. The outputs may then be used as inputs for further component programs, or written to a storage device.

The organization of the data in these partitions is often of considerable importance; in many cases the component program will produce incorrect results if the data is not properly partitioned. Furthermore, it is often the case that the ordering of data within each partition is of considerable importance. For example, many programs require that their input(s) be sorted in some fashion.

In order to effect correct partitioning of the data, it is common practice to use a separate "partitioner" program which takes an input file and divides it into p parts according to some rule. In cases where the manner of partitioning does not affect the results produced by the component program, the partitioner may divide the data in any fashion. It is also common that the partitioning be based on a mathematical function which assigns each record to one of the p partitions based on the data values in the record.

In the general case, each of the inputs will have been divided into q initial partitions, but not necessarily in a way consistent with the needs of the component program. To partition such data, the common practice is to run q copies of the partitioner program, with each copy being given as input one of the q initial partitions. Since each of the q copies of the partitioner program produces p output partitions, this will divide the input data into p*q partitions. It is common practice to solve this problem by employing a second "gatherer" program to combine groups of q partitions (one for each instance of the partitioner) and produce the final output.

It is desirable that applications, once written, be runnable with an arbitrary degree of parallelisms. This is necessary because, as time goes by, increasing volumes of data may necessitate the acquisition of a computer with a larger number of processors. In support of this, it is common practice to parameterize the partitioner/gatherer programs such that they can produce any desired number of partitions p, and such that the component program operates correctly. This property is called "scalability."

FIG. 1 is a diagram of a prior art partitioner/gatherer system for dividing q initial partitions into p output partitions. FIG. 1 illustrates such a system for the case of a component program which reads from a single input and writes to a single output. The input data 21 has been partitioned into q=3 initial partitions 1. The degree of desired parallelism is p=2. Three instances of a partitioner program 2 are run, producing six intermediate results which are transmitted along communication channels 3. These intermediate results are read by two instances of a gatherer program 4 producing two temporary files 5. Two instances of the component program 6 are then run, each of which reads from a distinct temporary file 5 and writes to a distinct output file 7. The output files 7 comprise the partitions of an output data set 22. Had there been multiple input data sets 21, then the partitioner 2, communication channels 3, gatherer 5, and temporary file 6 would have been replicated (possibly varying the number of partitioners 2 and gatherers 3), once for each input data set. It would also be possible to have multiple output data sets 22. Finally, it is possible that some individual input files will not be partitioned, but will rather be broadcast to all instances of the component program (not shown).

There are numerous variants on this architecture. For example, the temporary files 5 might be replaced by corresponding communication channels, or the communication channels 3 might be replaced with corresponding files.

FIG. 2 is a diagram of a prior art system illustrating an important special case of "prepartitioned data". This case occurs when the number of input partitions q equals the desired parallelisms of the component programs, and the way in which the input data 21 is partitioned is suitable to the component program 6. In this case, there is no need to partition the data, and the partitioners 2, communication channels 3, gatherers 4, and temporary files 5 may be eliminated. It is advantageous to take advantage of this special case, because the elimination of the partitioner/gatherer elements 2–5 saves considerable computational effort and considerable storage space.

It is possible that, if a component program 6 has multiple inputs, then some of its inputs will require partitioning as shown in FIG. 1, and that others will be "prepartitioned", as in FIG. 2.

To build a complex application having multiple component programs, one may link multiple computational units ("tasks") having structures as shown in FIG. 1 or FIG. 2. This linking is done by assigning the output partitions 7 of one stage of processing to corresponding input partitions 1 of the next stage.

For complex applications, it is desirable to have a "checkpointing" scheme which, if a system failure occurs, allows the application to be continued from a "checkpoint" that captures an intermediate state of the computation, rather than re-running the entire application from the beginning. For a general discussion of checkpointing, and a specific example of an improved checkpointing system in which the present invention may be of value, see the co-pending patent application entitled "Methods and Systems for Reconstructing the State of a Computation", assigned to the assignee of the present invention.

One of the constraints of checkpointing is that checkpoints may only be created when the system is "quiescent", i.e. when no application programs are executing. A system can be arranged to be quiescent between tasks, and thus create a checkpoint at the end of each task. It is also possible to create one checkpoint internal to a task, immediately after the gatherer programs 4 have finished running. It is possible, however, that these techniques may not yield sufficiently frequent opportunities for checkpointing. For example, if a component program 6 of a task runs for 10 hours, then the application will necessarily have a 10-hour period when no checkpoints are possible. If a failure occurs anytime during the 10 hours, the entire application must be restarted from the beginning. There is therefore a need for a method of permitting more frequent checkpoints in parallel component based applications. The present invention provides such a method that is particularly useful for applications running on parallel processing systems, and is also useful for applications running on distributed processing systems.

SUMMARY OF THE INVENTION

The present invention includes two methods for modifying a task in a complex parallel application such that it becomes quiescent (hence checkpointable) more frequently.

Initially, a parallel task starts with one or more input data sets having q initial partitions, divides the input data sets into p partitions by some combination of partitioning elements (i.e., partitioners/gatherers), runs an instance of a component program on each of the p partitions of the data, and produces one or more sets of output files, with each set being considered a partitioned data set. The present invention is applied to such a task to create a new, "overpartitioned" task as follows:

(1) The partitioner is replaced with an "overpartitioner" which divides its q inputs into n*p partitions, for some integer overpartitioning factor n.

(2) The component program is run in a series of n execution phases, with p instances of the component program being run at any time. In each phase, each instance of the component program will read one overpartition of the input data and produce one partition of output data.

(3) At the end of each of the n execution phases, the system is quiescent and may be checkpointed.

The invention encompasses two preferred embodiments. One embodiment is to "explicitly overpartition" the input data by using known partitioner programs, communication channels, and gatherer programs to produce overpartitioned intermediate files. This embodiment is applicable to tasks having the form shown in FIG. 1. The second embodiment is to "dynamically overpartition" the input data by arranging for the component programs to consecutively read contiguous subsets of the original input data. This embodiment is applicable to many tasks having the form shown in FIG. 2. The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

Figure 3A:
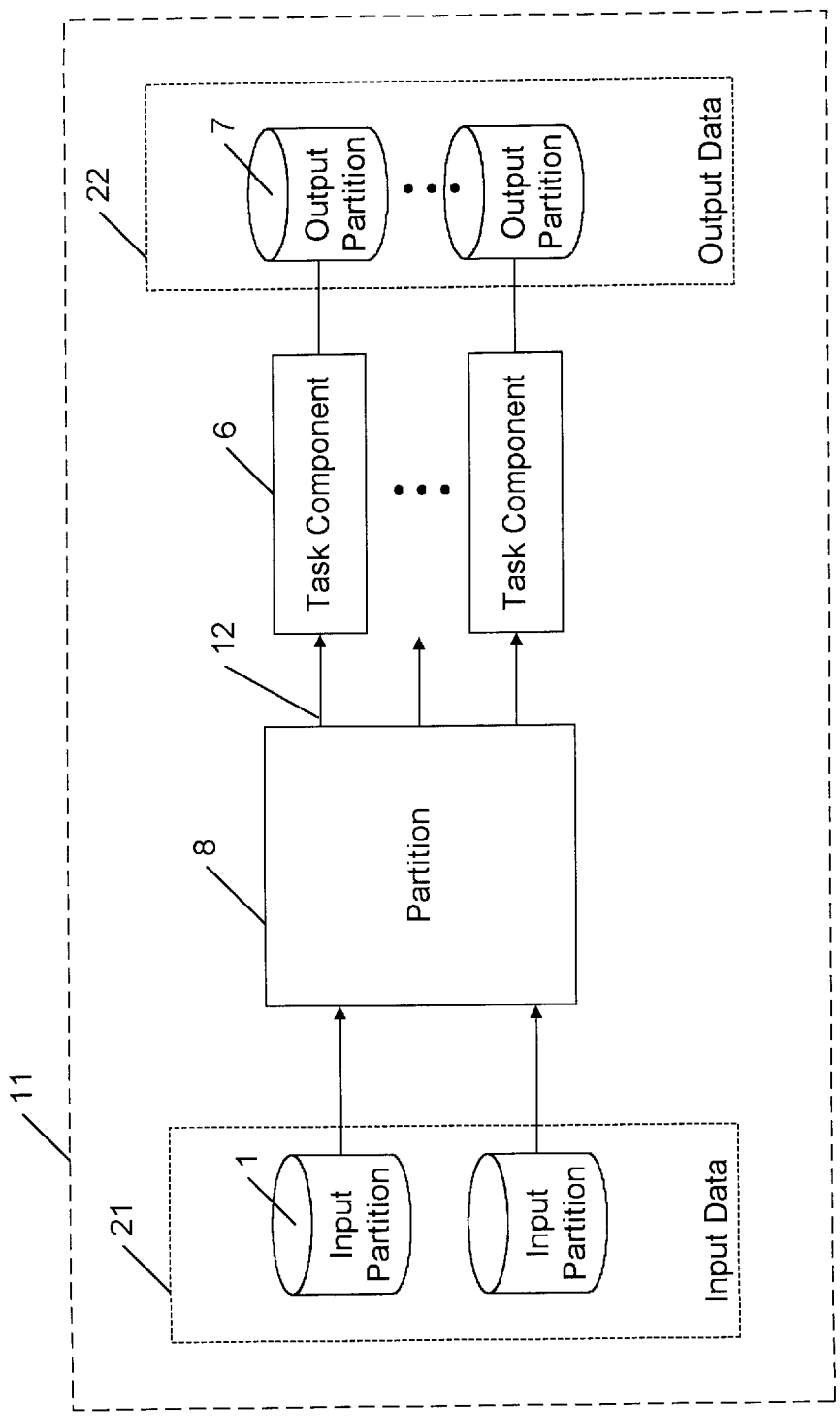
FIG. 3a is an overall diagram of an original task prior to application of an overpartitioning system in accordance with the present invention.

FIG. 3a is an overall diagram of an original task prior to application of an overpartioning system in accordance with the present invention. FIG. 3a shows a parallel task 11 which starts with one or more input data sets 21 having q input partitions 1, divides them into p partitions 12 by some combination of partitioning elements (i.e., partitioners/gatherers) 8, runs an instance of a component program 6 on each of the p partitions 12 of the data, and produces one or more output partitions 7 of the output data 22.

Figure 3B:
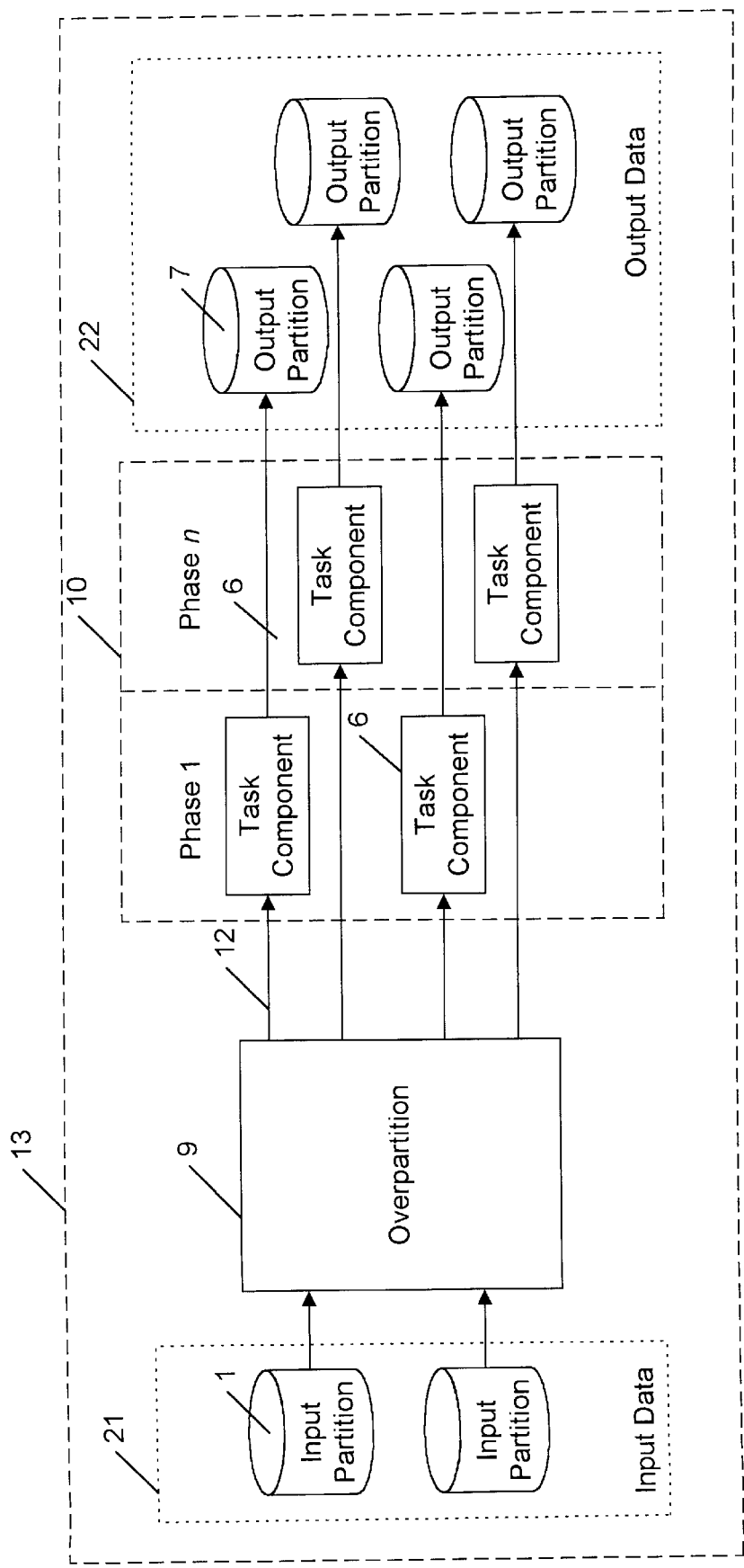
FIG. 3b is an overall diagram of the task of FIG. 3a after application of an overpartioning system in accordance with the present invention.

FIG. 3b is an overall diagram of the task of FIG. 3a after application of an overpartioning system in accordance with the present invention. A new, overpartitioned task 13 is created as follows:

(1) The partitioner 8 is replaced with an "overpartitioner" 9 which divides its q input partitions into n*p partitions 12 of data, for some integer overpartitioning factor n.

(2) The component program 6 is run in a series of n execution phases 10, with p instances of the component program being run at any time. In each phase, each instance of the component program 6 will read one partition 12 of the input data 21 and produce one partition 7 of the output data 22. The input data files 21 can be in any desired format, such as sequential, hierarchical, relational, etc.

(3) At the end of each of the n execution phases 10, the system is quiescent and may be checkpointed.

An important characteristic here is that, in most cases, the time required to run the component programs 6 is strongly tied to the volume of data to be processed, e.g., half the data may be processed in about half the time. An n-fold reduction in the volume of data may thus reduce the run-time of any instance of the component program 6 by a corresponding factor n, consequently reducing the interval between checkpointing opportunities by a factor of n.

Figure 1:
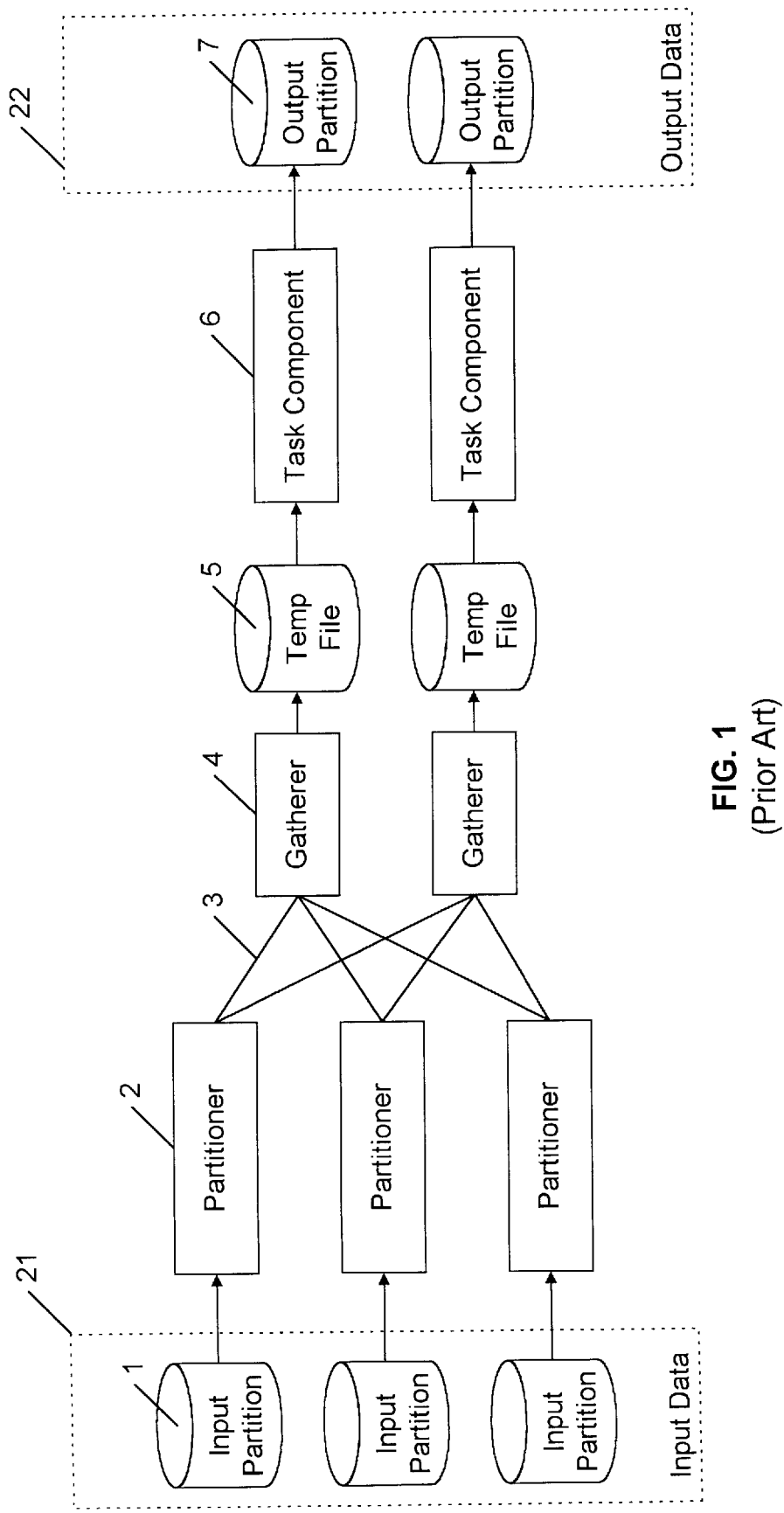
FIG. 1 is a diagram of a prior art partitioner/gatherer system for dividing q initial partitions into p output partitions.

The invention encompasses two preferred embodiments. One embodiment is to "explicitly overpartition" the input data 21 by using known partitioner programs 2, communication channels 3, and gatherer programs 4 to produce overpartitioned intermediate files 5. This embodiment is applicable to tasks having the form shown in FIG. 1. The second embodiment is to "dynamically overpartition" the input data 21 by arranging for the component programs 6 to consecutively read contiguous subsets of the original input data 21. This embodiment is applicable to many tasks having the form shown in FIG. 2.

Explicit Overpartitioning

The method of explicit overpartitioning uses existing partitioners 2, communication channels 3, and gatherers 4 to produce a set of intermediate "overpartitioned" files 5, and then runs the component programs 6 in multiple execution phases against the overpartitioned files. This method may be used if the following requirements are met:

(1) The method must be presented with q input partitions 1 from an input data set 21, a desired degree of parallelism p, and a desired degree of overpartitioning n.

(2) It is necessary that the partitioner program 2 may validly be configured to produce at least n*p output partitions.

(3) It is necessary that the component program 6 be "scalable," i.e., it must be known that the application produces valid results for any degree of parallelism p.

Figure 4:
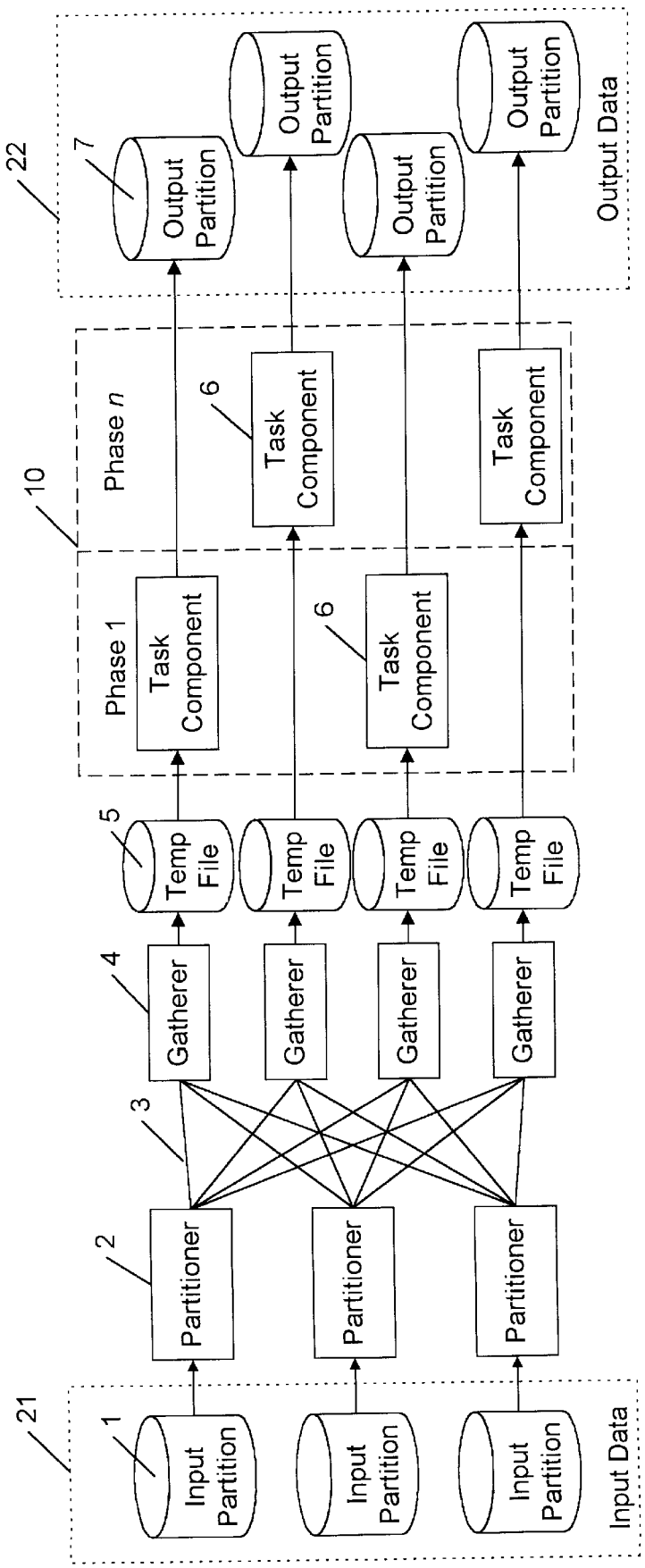
FIG. 4 is a more detailed diagram of the overpartitioning system of FIG. 3b, showing the preferred embodiment of an explicit overpartioning system in accordance with the present invention.

FIG. 4 is a more detailed diagram of the overpartitioning system of FIG. 3b, showing the preferred embodiment of an explicit overpartioning system in accordance with the present invention. If the above facts are true, explicit overpartitioning may be implemented as follows:

(1) qinstances of the partitioner 2 are set up to operate on q input partitions 1. Each instance of the partitioner 2 is configured to produce n*p partitions.

(2) n*p instances of the gatherer 4 are set up to operate on the output of the partitioners 2.

(3) The q instances of the partitioners 2 are connected with the n*p instances of the gatherers 4 using n*p*q communication channels 3, as shown.

(4) All the partitioners 2 and gatherers 4 are run, producing n*p temporary files 5.

(5) n execution phases 10 are performed as described above. In each phase, p instances of the component program 6 are run, with each such instance consuming data from one of the temporary files 5 and writing data to one of the output partition files 7, as in the prior art. The output will comprise n*p files.

In many cases, the logic of the component program 6 is such that the outputs produced by the n successive execution phases 10 will, if concatenated, produce the same set of p output files (rather than n*p) as in the non-overpartitioned case, regardless of the value of n. In this case, a set of p output files may be created by simply appending the outputs produced by each instance of the component program 6 during its successive execution phases 10. This has the benefit of reducing the number of output files which must be managed.

As in the prior art, there are numerous variants on this architecture. For example, the temporary files 5 might be replaced by corresponding communication channels, or the communication channels 3 might be replaced with corresponding files.

The above steps could be implemented either manually (e.g., by re-writing the software used to control the overall execution of the application), or automatically. In the preferred embodiment, the automatic case requires that the following information (or equivalent information) be specified, in machine-readable form, for each task:

(1) The desired degree of parallelism p, and the desired degree of overpartitioning n.

(2) The identity of the component program 6.

(3) The identities of the files comprising the input data 21 to the component program 6.

(4) For each input data set 21 for the task, the following additional information:

1) The identities of the files comprising its input partitions 1.

2) The identities of the partitioners 2 appropriate to that input.

3) The identities of the gatherers 4 appropriate to that input.

4) The identities of suitable storage devices where the p temporary files 5 may be stored.

(5) For each output data set 22, the identities of suitable storage devices where the p output partition files 7 may be stored.

(6) Identifiers for q "partition" processors on which the partitioners 2 may be run.

(7) Identifiers for p "gather" processors on which the gatherers 4 may be run (these may be the same as the partition processors, if desired).

(8) Identifiers for p "work" processors on which the component programs 6 may be run (these may be the same as the partition processors or gather processors, if desired).

(9) For the partitioners 2, the gatherer 4, and the component program 6, such information as is needed to cause them to be run, to connect them to data files and communication channels, and in the case of the partitioners 2, information on how to configure them to produce an arbitrary number of partitions, all in known fashion. In the preferred embodiment, this information is represented as a subroutine which, given the identities of the data files/subroutines to be connected to (additionally, for the partitioners 2, the number of partitions), will return a sequence of "argument line parameters" which will cause the program to be run as desired.

Figure 5A:
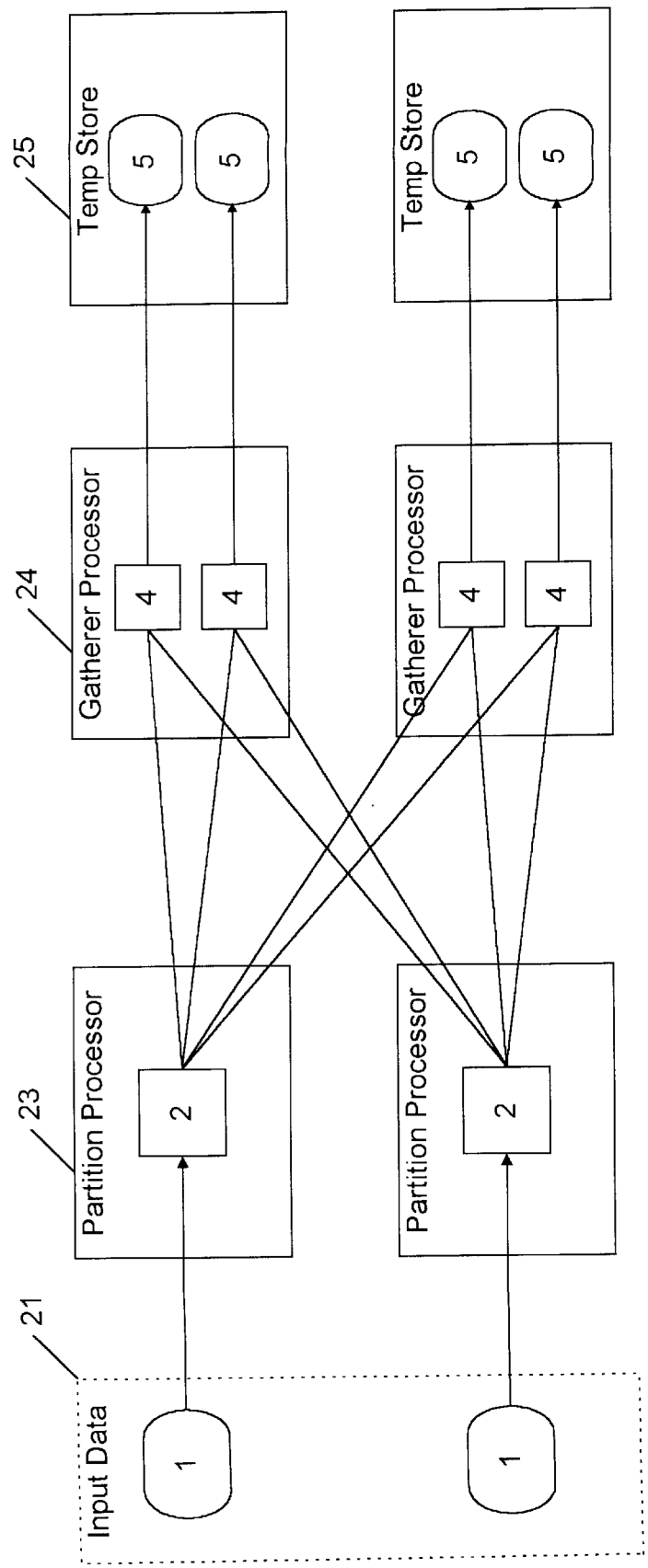
FIGS. 5a and 5b are more detailed diagrams showing the data flow and processor, communication, and storage relationships of a system for implementing an explicit overpartioning system in accordance with the present invention.
Figure 5B:
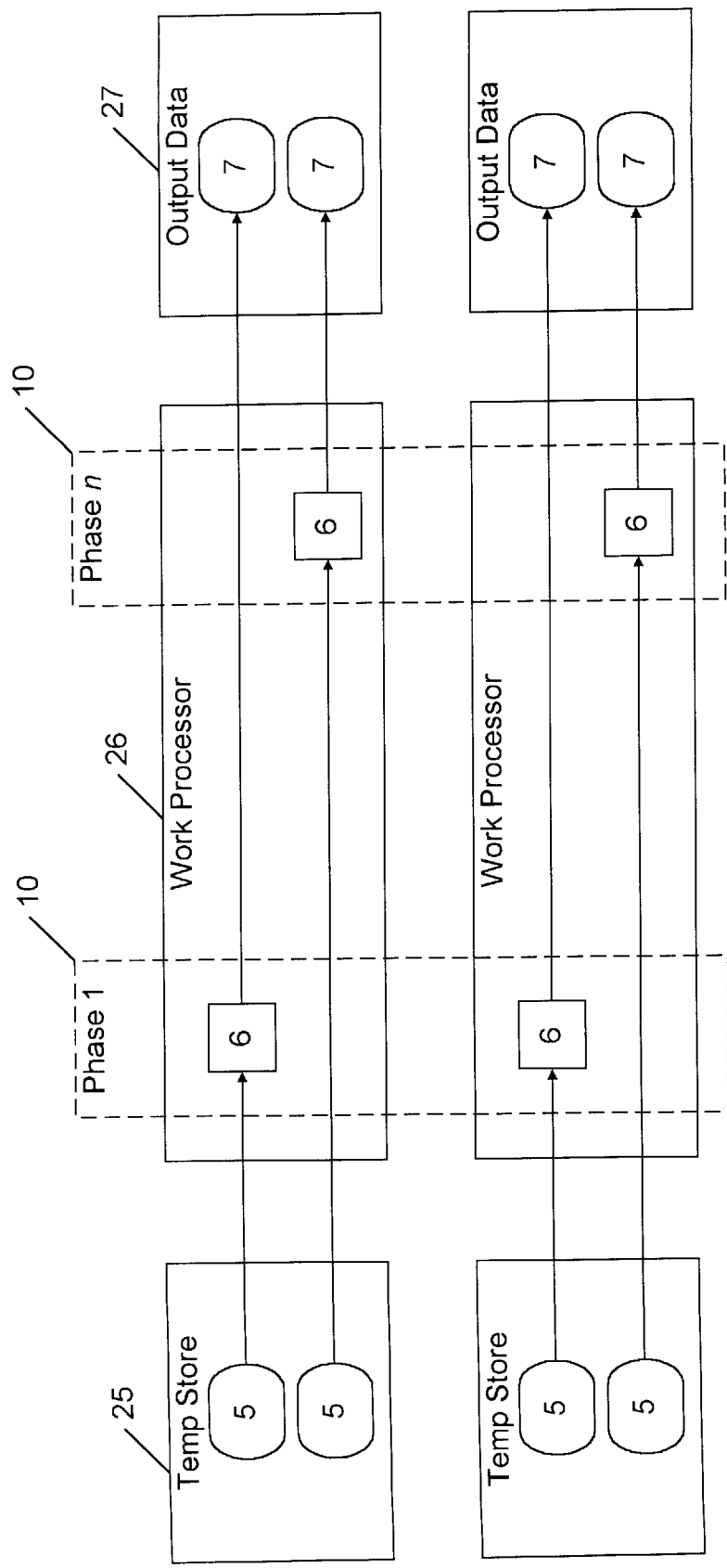

Once the above information (or its equivalent) is provided, the explicit overpartitioning algorithm may then be executed. FIGS. 5a and 5b are detailed diagrams showing the data flow and processor, communication, and storage relationships of a system for implementing an explicit overpartioning system in accordance with the present invention.

Referring to FIG. 5a, the files comprising the input data 21 for the task are iteratively processed in the following manner in the preferred embodiment:

(1) Identifying the number q of input partitions 1 for the data input files 21 at hand.

(2) Creating n*p*q communication channels 3 by:

1) Originating the first n*p channels 3 on a first partition processor 23, originating the next n*p channels on a next partition processor 23, etc.

2) Connecting the first n channels 3 to a first gather processor 24, connecting the next n channels to a next gather processor 24, etc., until n*p communication channels have been assigned, at which time the cycle repeats starting back with the first gather processor 24.

(3) Running q instances of the partitioner 2, where:

1) Each instance is assigned to one of the partition processors 23.

2) Each instance is configured to produce n*p output partitions.

3) Each instance connects to all of the communication channels 3 originating in its processor.

4) The ith instance reads from the ith input partition 1 of the input data set 21.

(4) Running n*p instances of the gatherer 4, where:

1) n instances are assigned to each of the gather processors 24.

The ith instance on each processor connects to the ith incoming communication channel 3, the n+ith channel 3, the 2n+ith channel 3, etc., until no more communication channels 3 remain unconnected.

2) The instances running on the kth gather processor 24 write a kth temporary file 5 on a storage device in a set of "temporary file" storage devices 25 (for higher performance, each instance running on the kth gather processor 24 writes to a kth temporary file 5 on a separate, kth storage device).

(5) Waiting for all instances of the partitioner 2 and the gatherer 4 to finish running, then deleting the communication channels 3.

(6) Optionally, checkpointing the system before going on to the next set of input data files 21 (at this point, the overpartitioning of the data input files 21 at hand is completed; note that checkpointing need not necessarily be actually performed at each checkpointable event).

(7) Repeated steps (1)–(6) for any next set of input data files 21.

Referring to FIG. 5b, n execution phases 10 are run against data in the temporary files 5 in the following manner in the preferred embodiment:

(1) Running p copies of the component program 6, one on each of the work processors 26, during each of the n execution phases 10.

(2) During the ith execution phase 10, the instance of the component program 6 running on the jth work processor 26 reading the ith temporary file 5 from a temporary storage device 25, and writing to the ith output partition file 7 on an output storage device 26 (for higher performance, each instance running on the jth work processor 26 reads the ith temporary file 5 from the jth temporary storage device 25, and writes to the ith output partition file 7 on a separate, jth output storage device 27).

(3) Optionally, deleting the temporary files 5 in each execution phase 10 in which they are consumed.

(4) Waiting for termination of all p instances of the component program 6 running in each of the n execution phases 10, at which point the system may be checkpointed.

Thus, at the end of each of the n execution phases 10, p instances of the component program 6 will have processed 1/n of the total input data 21, and are then quiescent and may be checkpointed. For example, if q=2 and p=5, under the prior art, each component program 6 would process ⅕ of the total input data 21 in one cycle time; assuming concurrent execution of all component programs 6, all of the data is processed in the same cycle time. However, no checkpointing could occur until a cycle terminates. By using the present invention, and selecting an overpartitioning factor of 3, the total number of partitions to process is 3*5=15. However, only 5 partitions, each about ⅓ the size of a prior art partition, is processed in each execution cycle. Assuming linear processing times, the cycle time for each component program 6 is about ⅓ the prior art cycle time. Checkpointing may be done after each such reduced cycle, and then a next execution phase 10 started. Checkpointing and execution phases 10 are then repeated until all overpartitions are processed.

Dynamic Overpartitioning

Figure 2:
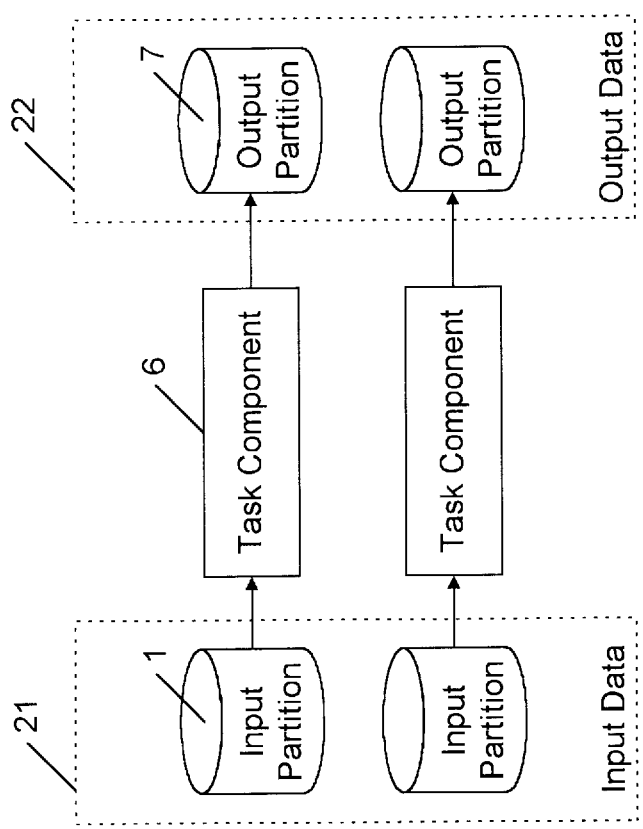
FIG. 2 is a diagram of a prior art system illustrating the special case of "prepartitioned data".

As noted above, in some cases the input data 21 is initially partitioned in a way amicable to the component program 6, in which case the optimization shown in FIG. 2 becomes possible (i.e., the partitioners 2, communication channels 3, gatherers 4, and temporary files 5 are eliminated). The explicit overpartitioning method necessarily involves the use of partitioners, etc., and so it loses the benefits of the pre-partitioned optimization.

Figure 6:
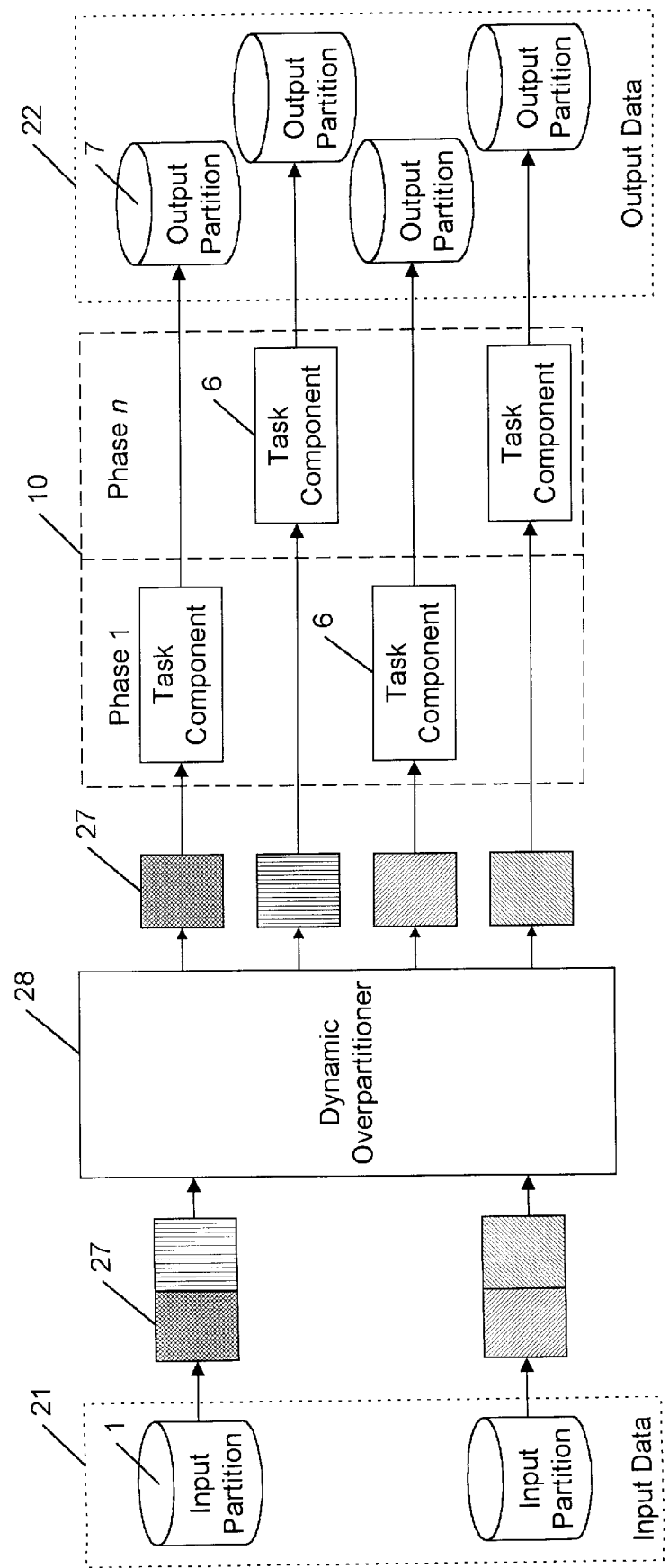
FIG. 6 is a more detailed diagram of the overpartitioning system of FIG. 3b, showing the preferred embodiment of a dynamic overpartioning system in accordance with the present invention.

The second embodiment of the present invention does not rely on partitioners, etc. to create temporary, overpartitioned files 5. Instead, the second embodiment effectively repartitions an input data file 1 in place. This method is referred to as "dynamic overpartitioning". FIG. 6 is a more detailed diagram of the overpartitioning system of FIG. 3b, showing the preferred embodiment of a dynamic overpartitioning system in accordance with the present invention. This method may be used if partitions acceptable to the component program 6 may be obtained by dividing the input files 1 into sequential partitions called data segments 27 (the manner of generating such segments is explained below).

The dynamic overpartitioning operation 28 has the effect of allowing the component programs 6 to access the data segments 27 of the input partitions 1, with one segment from each input partition I being processed by the component programs 6 in each of a plurality of execution phases 10, in a manner similar to explicit overpartitioning. The dynamic overpartitioning operation 28 does this without creating temporary files. The essence of dynamic overpartitioning is to "trick" each instance of the component program 6 into reading a data segment 27 of the input data file 1, but allowing such instance to think it is reading a complete data set 1.

Figure 7:
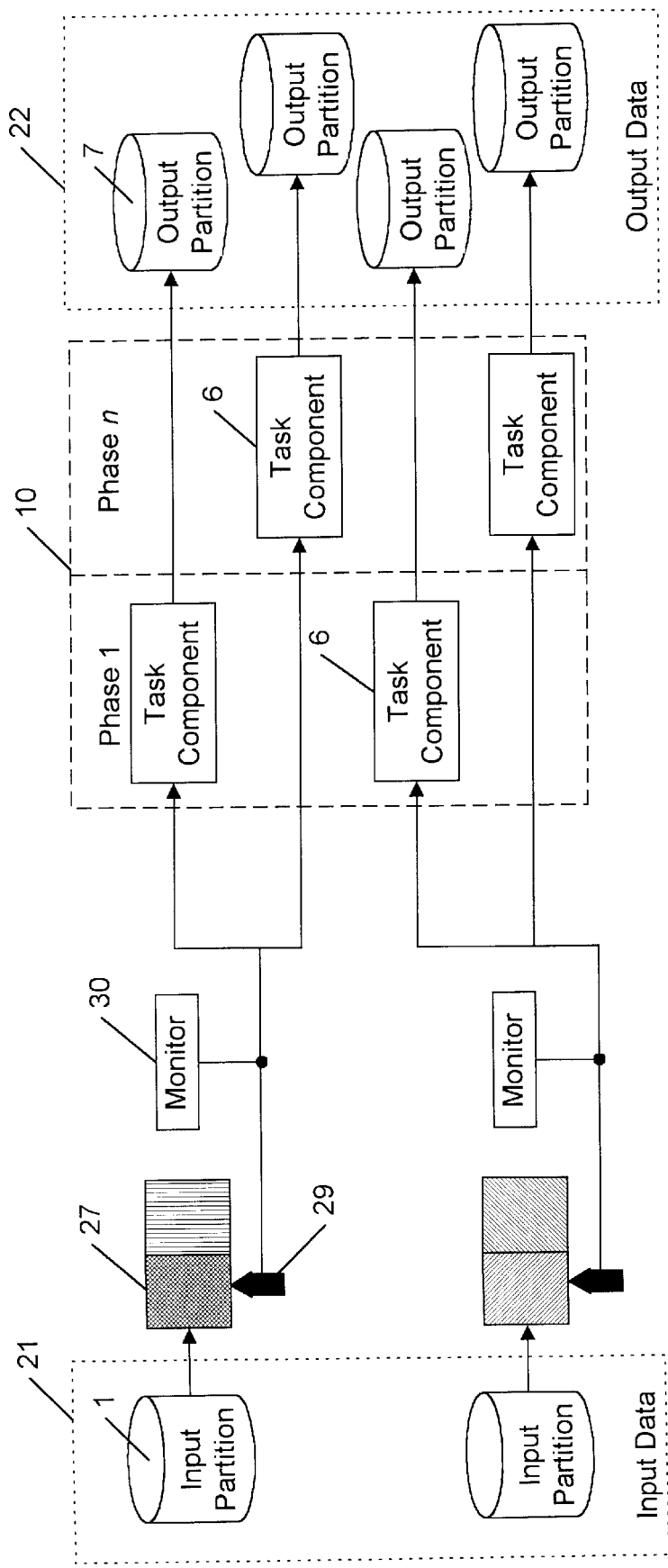
FIG. 7 is a more detailed diagram showing the data flow and processor, communication, and storage relationships of a system for implementing a dynamic overpartitioning system in accordance with the present invention.

FIG. 7 is a more detailed diagram showing the data flow and processor, communication, and storage relationships of a system for implementing a dynamic overpartitioning system in accordance with the present invention. Dynamic overpartitioning is implemented in the preferred embodiment as follows:

(1) Creating a persistent "cursor" 29 and a monitor 30 for every input partition 1. (The dynamic overpartitioning operation 28 of FIG. 6 comprises the cursor 29 and the monitor 30. The cursor 29 remembers a position (e.g., a byte offset) within the input partition 1. This permits the component program 6 to read data from the input file 1 at the position currently indicated by the cursor 29. The monitor 30 inspects the data record pointed to by the cursor 29, and at a suitable time may instruct the cursor 29 to indicate "end of file" (EOF) rather than returning the next data record in the input partition 1.)

(2) Running p instances of the component program 6 in each execution phase 10.

(3) Accessing data in a data segment 27 only via the cursor 29 (rather than permitting the component program 6 to access the input partition 1 directly).

(4) Instructing the cursor 29 to indicate EOF when the monitor 30 detects the end of a data segment 27, as further described below. (Because the cursor 29 is not really at the end of the input partition 1, this event is referred to as an "artificial end of file.")

(5) Terminating the component programs 6 (each of which has processed all of the data in a corresponding data segment 27).

(6) Thereafter, writing the contents of the cursor 29 and monitor 30 to persistent storage, preferably using a two-phase commit protocol comprising part of a checkpointing system.

(7) Optionally, checkpointing the system before going on to the next data segment 27.

(8) At the start of the next execution phase 10, reading the contents of the cursor 29 and monitor 30 into working storage.

(9) Begining further execution of the component programs 6 using a corresponding cursor 29 to access data. (Each cursor 29 will now be referring to a middle portion of an input partition 1, more specifically, to the start of a next one of the data segments 27 of that input partition 1. Thus, processing will start up exactly where it left off in the previous execution phase 10. The output of each execution phase 10 is appended to each prior execution phase output, making it appear that the application proceeded through the input data files 21 from the beginning to end without pause.)

(10) Terminating all execution when all cursors 29 reach the "real" end of its input partition 1 (i.e., no more phases will be executed since all data has been processed).

The determination of when a monitor 30 instructs a cursor 29 to signal an artificial EOF depends on the partitioning scheme employed by the component program 6. There are several cases.

First, it is possible that the input data for the component programs 6 may be partitioned in any arbitrary fashion. This may occur if, for example, the processing of one record is completely independent of the processing of the next. In this case, segment boundaries may fall on any convenient record boundary.

Second, it is possible that the component programs 6 may require that all records having the same value of some key (e.g., employee number) be allocated to the same segment 27. In this case, the input data 1 should be sorted according to that key. In this case, segment boundaries preferably are constrained to fall on the boundaries between runs of consecutive records with identical key values.

Third, it is possible that the component programs 6 read from multiple inputs, and requires that all records having a given key-value be processed in the same execution phase. In this case, the data in all such input files should be sorted on the input key, and the various monitors 30 preceding the component programs 6 must coordinate artificial EOF signals such that all cursors 29 segment their data on the same key value boundary.

Finally, some mechanism is needed for determining when the monitors 30 will begin looking for a suitable spot to introduce an artificial EOF. Note that, in the case of dynamic overpartitioning, the degree of overpartitioning need not be determined in advance. The component programs 6 are run until some event occurs (e.g., a particular data value occurs in the input data stream, or a specified time interval expires, or a specified number of bytes or records are processed, or a specified percentage of input data file size is processed, etc.).

Figure 8:
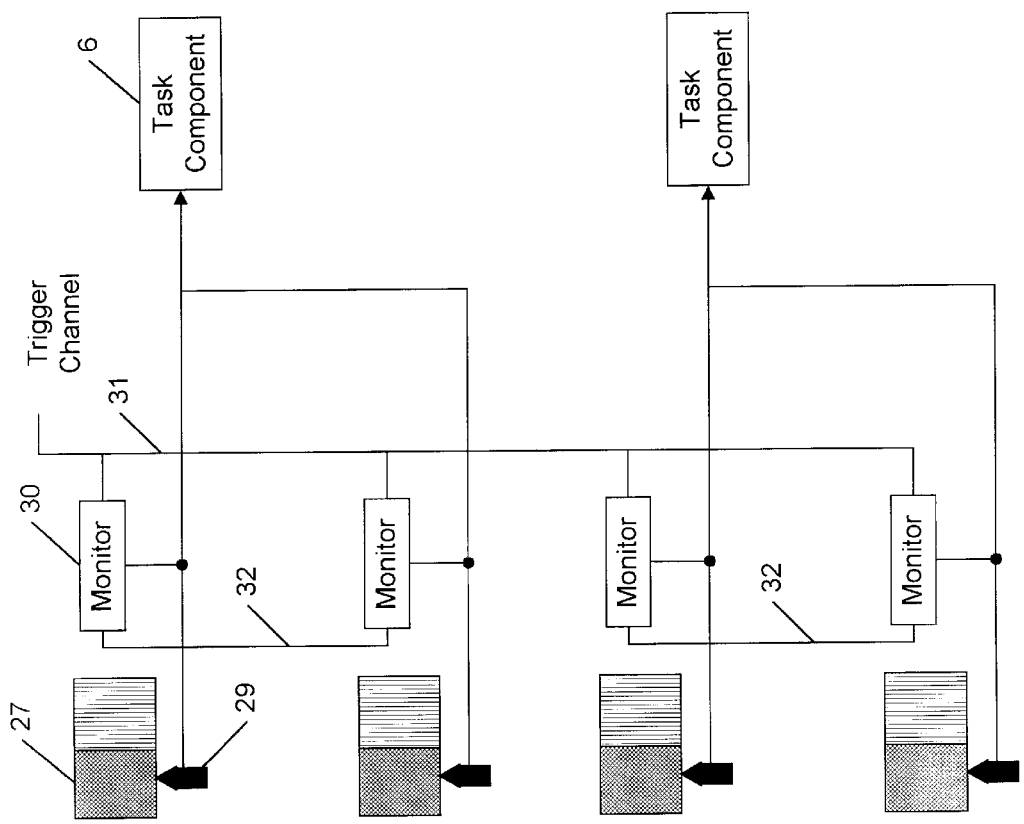
FIG. 8 is a diagram showing the data flow, function, and communication relationships of a system for implementing cursors and monitors in a dynamic overpartitioning system in accordance with the present invention.

These requirements may be met by the architecture shown in FIG. 8, which is a diagram showing the data flow, function, and communication relationships of a system for implementing cursors 29 and monitors 30 in a dynamic overpartitioning system in accordance with the present invention.

(1) All monitors 30 share a global "trigger channel" 31 for mutual communication.

(2) All monitors 30 which must "coordinate" on a particular key-value are connected via a coordination channel 32 (there may be multiple coordination channels 32).

(3) Any monitor 30 may, at any time, broadcast a "phase break" message on the trigger channel 31; the message will be received by every other monitor 30 on the trigger channel 31. Typically, such an event will happen after a certain period of time has elapsed, after a certain amount of data has passed through the monitor, or after some key-value is seen in a record.

(4) Once a phase break message has been received, each monitor 30 obtains the key from the last record that was actually read from its current data segment 27 and transmits that key to a designated "master monitor" on its coordination channel 32.

(5) Each master monitor waits until one key has been received from each monitor 30 on its coordination channel 32 (including itself), then finds the greatest key-value from this set. This key is referred to as the "breakpoint key."

(6) Each master monitor broadcasts the breakpoint key to all monitors 30 on its coordination channel 32.

(7) Each monitor 30 then enables its corresponding cursor 29 to continue delivering data to a corresponding component program 6, until a key is reached which exceeds the value of the breakpoint key. At this point, an artificial EOF signal is generated by that monitor 30, leading to the end of the current execution phase 10.

(8) In the special case where there is no need to coordinate monitors 30 (e.g., if the component programs 6 reads from a single data input file 21), each coordination channel 32 contains a single monitor 30 (ie., no sharing of information between monitors is required). The above algorithm is otherwise unchanged. In an alternative form, no coordination channels 32 are established at all.

(9) In the special case where phase break may be created without regard to keys (e.g., based on elapsed time or number of records, etc.), the monitors 30 simply generate an artificial EOF immediately upon receipt of a phase-break message on the trigger channel 31.

The cursor 29 and monitor 30 combination can be interposed between the component programs 6 and the input partitions 1 in any of at least three ways:

(1) The component program 6 may be written or re-written using a subroutine library implementing cursors 29 and monitors 30. This requires access to the source code for the component program 6 and may be time consuming, but may deliver the highest performance.

(2) The component program 6 may be linked against a run-time library which intercepts calls to the underlying input/output mechanisms, in known fashion. For example, a call to "open" could be intercepted and turned into a call to "open cursor"; a call to "read" could be intercepted and turned into a call to "read from cursor." This requires access to the object code for the component program 6, but is likely to be highly efficient.

(3) An "adaptor process" may be interposed between each component program 6 and its input partition 1. The adaptor process reads the input partition 1 file via the cursor/monitor mechanism, then forwards data to the component program 6 via a communication channel or temporary file, in known fashion. This option only requires access to the executable (binary) form of the component program 6, but may be somewhat inefficient due to the cost of copying data from the input partition 1 file to a communication channel or temporary file.

In summary, by "tricking" each instance of the component program 6 into reading only one data segment 27 of the input data file 1 at a time, and then forcing a "natural" termination of the component programs 6 by generating an artificial EOF at the end of each data segment 27, the application becomes quiescent more frequently, thus allowing better checkpointing of an application that does not inherently support frequent checkpointing.

The present invention thus includes two methods for modifying a task in a complex parallel application such that it becomes quiescent (hence checkpointable) more frequently. The present invention provides such a method that is particularly useful for applications running on parallel processing systems, and is also useful for applications running on distributed processing systems.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for increasing the frequency of checkpoints in a computer application executable on a parallel processing system, comprising the steps of:
   (a) overpartitioning q data inputs by functionally dividing the q data inputs into n*p data partitions, for some integer overpartitioning factor n;
   (b) executing p instances of a component program in a series of n execution phases, each instance of the component program reading one of the n*p data partitions and producing a corresponding partition of output data; and
   (c) enabling checkpointing at the end of each of the n execution phases.

2. The method of claim 1, wherein the step of functionally dividing q data inputs into n*p data partitions comprises the further steps of:
   (a) applying a partitioning program, configured to output n*p*q channels of data, to the q data inputs; and
   (b) applying a gathering program to the n*p*q channels of data output by the partitioning program, to generate the n*p data partitions.

3. The method of claim 1, wherein the step of functionally dividing q data inputs into n*p data partitions comprises the further steps of:
   (a) using p cursors to divide the q data inputs into n data segments;
   (b) recurrently generating end-of-file signals to indicate the end of each data segment.

4. A computer program for increasing the frequency of checkpoints in a computer application executable on a parallel processing system, the computer program being stored on a media readable by a computer system, for configuring the computer system upon being read and executed by the computer system to perform the functions of:
   (a) overpartitioning q data inputs by functionally dividing the q data inputs into n*p data partitions, for some integer overpartitioning factor n;
   (b) executing p instances of a component program in a series of n execution phases, each instance of the component program reading one of the n*p data partitions and producing a corresponding partition of output data; and
   (c) enabling checkpointing at the end of each of the n execution phases.

5. The computer program of claim 4, wherein the function of functionally dividing q data inputs into n*p data partitions comprises the further functions of:
   (a) applying a partitioning program, configured to output n*p*q channels of data, to the q data inputs; and
   (b) applying a gathering program to the n*p*q channels of data output by the partitioning program, to generate the n*p data partitions.

6. The computer program of claim 4, wherein the function of functionally dividing q data inputs into n*p data partitions comprises the further functions of
   (a) using p cursors to divide the q data inputs into n data segments;
   (b) recurrently generating end-of-file signals to indicate the end of each data segment.

7. A computer-readable storage medium, configured with a computer program for increasing the frequency of checkpoints in a computer application executable on a parallel processing system, where the storage medium so configured causes a computer to operate in a specific and predefined manner to perform the functions of:
   (a) overpartitioning q data inputs by functionally dividing the q data inputs into n*p data partitions, for some integer overpartitioning factor n;
   (b) executing p instances of a component program in a series of n execution phases, each instance of the component program reading one of the n*p data partitions and producing a corresponding partition of output data; and
   (c) enabling checkpointing at the end of each of the n execution phases.

8. The computer-readable storage medium of claim 7, wherein the function of functionally dividing q data inputs into n*p data partitions comprises the further functions of:

(a) applying a partitioning program, configured to output n*p*q channels of data, to the q data inputs; and (b) applying a gathering program to the n*p*q channels of data output by the partitioning program, to generate the n*p data partitions.

9. The computer-readable storage medium of claim 7, wherein the function of functionally dividing q data inputs into n*p data partitions comprises the further functions of:

(a) using p cursors to divide the q data inputs into n data segments;

(b) recurrently generating end-of-file signals to indicate the end of each data segment.

10. A computer program, residing on a computer-readable medium, for increasing the frequency of checkpoints in a computer application executable on a parallel processing system, comprising instructions for causing a computer to:

(a) overpartition q data inputs by functionally dividing the q data inputs into n*p data partitions, for some integer overpartitioning factor n;

(b) execute p instances of a component program in a series of n execution phases, each instance of the component program reading one of the n*p data partitions and producing a corresponding partition of output data; and (c) enable checkpointing at the end of each of the n execution phases.

11. The computer program of claim 10, wherein the instructions for causing a computer to functionally divide q data inputs into n*p data partitions further include instructions for causing the computer to:

(a) apply a partitioning program, configured to output n*p*q channels of data, to the q data inputs; and (b) apply a gathering program to the n*p*q channels of data output by the partitioning program, to generate the n*p data partitions.

12. The computer program of claim 10, wherein the instructions for causing a computer to functionally divide q data inputs into n*p data partitions further include instructions for causing the computer to:

(a) using p cursors to divide the q data inputs into n data segments;

(b) recurrently generate end-of-file signals to indicate the end of each data segment.

* * * * *